United States Patent [19]

Koll et al.

[11] Patent Number: 4,778,603
[45] Date of Patent: Oct. 18, 1988

[54] PROCESS FOR THE PREPARATION OF A CONCENTRATED AQUEOUS REACTIVE DYESTUFF SOLUTION

[75] Inventors: Jochen Koll; Joachim Wolff, both of Odenthal; Detlef Szeymies, Kuerten, all of Fed. Rep. of Germany

[73] Assignee: Bayer Aktiengesellschaft, Leverkusen, Fed. Rep. of Germany

[21] Appl. No.: 146,907

[22] Filed: Jan. 22, 1988

[30] Foreign Application Priority Data

Feb. 7, 1987 [DE] Fed. Rep. of Germany ....... 3703738

[51] Int. Cl.$^4$ .............................................. B01D 13/00
[52] U.S. Cl. .................................. 210/650; 210/500.27
[58] Field of Search ............... 210/634, 641, 644, 649, 210/650, 651, 653, 654, 655, 500.27–500.43; 8/650, 527, 918, 922

[56] References Cited

U.S. PATENT DOCUMENTS

4,436,523 3/1984 Hugelshofer et al. .................. 8/527
4,690,765 9/1987 Linder et al. .................. 210/500.33

Primary Examiner—Frank Sever
Attorney, Agent, or Firm—Sprung Horn Kramer & Woods

[57] ABSTRACT

Ultrafiltered solutions of the dyestuff of the formula

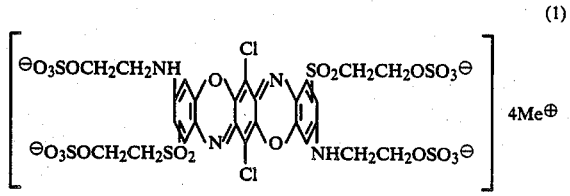

(Me=cation)

such as is obtained directly on synthesis, are distinguished by an increased tinctorial strength in pad-steam dyeing of cellulose fibres.

2 Claims, No Drawings

PROCESS FOR THE PREPARATION OF A CONCENTRATED AQUEOUS REACTIVE DYESTUFF SOLUTION

The present invention relates to a process for the preparation of a concentrated storage-stable aqueous solution of the dyestuff of the formula

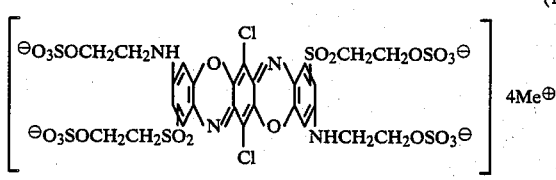

(1)

wherein $Me^{\oplus}$ is a cation conferring water-solubility.

The process is characterized in that solutions of the dyestuff obtained on synthesis are subjected to a membrane separation process.

Suitable cations in formula (1) are those which lead to a good solubility of the dyestuff in water, that is to say, in particular, protons of alkali metal and ammonium ions.

Mixtures of $Li^+$ with $H^+$, $K^+$, $Na^+$ and $NH_4$ with an $Li^+$ content of $>1$ equivalent are preferred.

The preparation of concentrated storage-stable reactive dyestuff solutions via membrane separation processes is generally known and is described in a number of publications, such as, for example, in German Pat. No. A-2,948,292, German Pat. No. A-3,148,878, European Pat. No. A-41,240, European Pat. No. A-59,782 and European Pat. No. A-114,031.

Surprisingly, it has now been found that, in contrast to all the dyestuffs described therein, a solution of the dyestuff of the formula (1) prepared via a membrane separation process gives considerably higher colour yields in the pad-steam dyeing process in comparison with solutions of the dyestuff which have not been prepared via a membrane separation process.

The dyestuff of the formula I and its preparation are known (compare European Pat. Nos. A-1,535,99 and 141,996):

Various starting materials can be used for the preparation of the dyestuff solutions to be employed in the process according to the invention:

(a) the powder obtained from the reaction mixture of the dyestuff synthesis by spray drying,
(b) the moist pressed paste salted out from the reaction liquor, or—preferably
(c) the condensation solution, buffered to pH 2.5 with sulphuric acid, of the reactive dyestuff of the formula (I) prepared in accordance with the above European Pat. No. A-153,599. The solution of the dyestuff is concentrated via a membrane separation process and if appropriate purified before the concentration. The dyestuff content in the solution before the membrane separation process is at least 1.5% by weight, preferably 3.5-9.5% by weight, at a pH of 1-6, preferably pH 3-5.

The purification of the dyestuff solution is achieved by replacing some or all of the permeate withdrawn during the membrane separation process by demineralized water.

Membrane separation processes used are, for example, reverse osmosis, ultrafiltration, dialysis, electrodialysis. or combinations of the processes mentioned.

Pressure permeation, that is to say reverse osmosis and ultrafiltration, is preferably used.

In this process, a solution is passed over a semipermeable membrane under pressure. Depending on the "cut-off level" of the membrane used, water, inorganic salts and reaction precursors and by-products permeate the membrane.

The dyestuff should largely be retained, preferably to the extent of more than 95%, by the membrane used.

Such membranes can be made of the most diverse materials, such as, for example, cellulose di- or triacetate, regenerated cellulose, polyamides, polysulphones, polyacrylonitrile, polyolefines and the like.

Also other materials, such as are described, for example, in the publications European Pat. No. A-25,973, European Pat. No. A-26,399, European Pat. No. A-82,355, German Pat. No. A-2,502,254, U.S. Pat. No. 4,247,401 and European Pat. No. A-194,546.

Furthermore those of porous glass or "dynamic" membranes in which, for example, a heavy metal oxide is deposited on a porous carrier.

The module containing the membranes can have any desired shape. The following membrane or module shapes can usually be employed: hollow fibre, hollow fine fibre, tubular, wound or plate frame modules.

The pressures to be applied depend on the requirements of the particular module and the particular membrane.

The pH and the temperature are not critical in respect of the membrane or module, since suitable membranes and modules are available for all pH and temperature ranges.

After the membrane separation process, concentrated solutions of the dyestuff of the formula (1) are obtained and, if appropriate, can also be buffered.

Examples of suitable buffer substances which can be used are Na acetate, boric acid and phosphate and/or citrate buffers.

The concentrated aqueous storage-stable solutions, according to the invention, of the dyestuff of the formula (1) contain 8 to 30%, preferably 12 to 25%, of dyestuff of the formula (1), 0 to 6%, preferably 0 to 3%, $SO_4^{--}$, 0 to 1%, preferably 0 to 0.5%, of $Cl^-$, 0 to 1% of buffer substance and water to 100%.

The pH of the solutions is preferably pH 3–5.

The present invention furthermore relates to the use of concentrated aqueous storage-stable reactive dyestuff solutions for the preparation of dyebaths, padding liquors and printing pastes for dyeing and printing natural and regenerated cellulose fibres, such as, above all, cotton and viscose.

EXAMPLE 1

15 kg of the reaction solution of the dyestuff of the formula (1) such as is obtained according to Example 2a of European Pat. No. A-141,996 (before salting out) are diluted with 9 kg of demineralized water to give a solution containing 6.25% of pure colour and 4.6% of $SO_4^{--}$. This solution is concentrated at a temperature of about 25° C., a pH of 4 and a pressure of 40 bar on a plate frame module, a commercially available composite membrane (carrier layer: polysulphone, membrane layer: polyamide) which retains the dyestuff to more than 99% being used. After removal of 18 kg of salt-containing permeate, the concentrate is diluted with 4 kg of demineralized water and buffered with 50 g of boric acid.

A low-viscosity storage-stable liquid formulation of the dyestuff of the formula (1) containing about 15% of pure colour, 2.8% of $SO_4^{--}$, 0.5% of $Cl^-$, 0.5% of boric acid and water to 100% is obtained.

This liquid grade can be used directly for the preparation of dyebaths, padding liquors and printing pastes for dyeing natural and regenerated cellulose fibres, such as cotton and viscose. Padding is carried out at 20° C. on cotton with a 70% liquor application in a padder using a liquor consisting of 50 g of a liquid grade according to Example 1 containing 15% of pure dyestuff of the formula (1), 10 g of a polyacrylate thickener, 5 g of a wetting agent based on esters of an inorganic acid and water as the remainder.

After intermediate drying (2 minutes, 120° C.), padding is carried out with 250 g/l of NaCl and 10 g/l of NaOH 38° Be at a liquor pick-up of 70%, and the fabric is then steamed with saturated steam at 102° C. for 1 minute for fixing. After washing out (4×at 80° C.), a 20% deeper dyeing in a brilliant blue shade is obtained in comparison with the use of a dyestuff solution with the same amount of dyestuff but not prepared via ultrafiltration.

EXAMPLE 2

15 kg of the reaction solution from Example 1 are purified on a plate frame module by pressure permeation at a temperature of about 25° C., a pH of 4 and a pressure of 40 bar. For this, 10 kg of salt-containing permeate are replaced continuously by 10 kg of demineralized water.

The solution is then concentrated by removal of 9 kg of permeate.

A commercially available polysulphone membrane which retains the dyestuff to more than 98% is used.

The concentrate is buffered with 50 g of boric acid. A low-viscosity storage-stable liquid formulation of the dyestuff of the formula (1) containing about 25% of pure colour, 2.8% of $SO_4^{--}$, 0.5% of $Cl^-$, 0.8% of boric acid and water to 100% is obtained.

The technological advantages are the same as those described in Example 1.

EXAMPLE 3

150 kg of the reaaction solution from Example 1 are concentrated with 90 kg of demineralized water on a commercially available wound module with a composite membrane (carrier layer: polysulphone, membrane layer: polyamide) which retains the dyestuff to more than 99%.

After removal of 180 kg of salt-containing permeate, the concentrate is diluted with 40 kg of demineralized water and buffered with 0.5 kg of boric acid.

A solution of the same composition as in Example 1 with the same technological properties is obtained.

EXAMPLE 4

1.5 kg of the K salt of the dyestuff of the formula (1) are dissolved in 18 kg of demineralized water and converted largely into the protonated form by addition of about 4 l of strongly acid cation exchanger (pH $\leq 1$).

The ion exchanger is filtered off and the filtrate is brought to pH 4.5 with 4.5 kg of a dilute aqueous solution containing NaOH and LiOH in a molar ratio of 1:1.

The resulting 24 kg of the solution containing 5.3% of pure colour and 0.33% of $Cl^-$ are concentrated to a pure colour of 18.8% on a plate frame module under the conditions described in Example 1 with the membranes mentioned therein, by withdrawal of 17.2 kg of salt-containing permeate. The resulting solution containing 0.33% of $Cl^-$ and with a pH of 4–4.5 can be used directly and shows the same technological properties as the solution from Example 1.

The solution can be buffered as in the previous examples for further increasing the storage stability.

EXAMPLE 5

1.850 kg of a solution of the dyestuff of the formula (1) with a dyestuff content of 1.34% and a $Ca^{++}$ content of 600 mg/kg of solution are converted into the largely protonated form via an ion exchanger column filled with strong acid cation exchanger in the H form.

This solution, pH 1, is brought to pH 4–4.5 with 100 kg of a dilute aqueous solution of LiOH and NaOH in a molar ratio of 1:1.

The solution, now with a dyestuff content of 1.27%, is concentrated to a solution amount of 850 kg on the module and membranes and under the same conditions as described in Example 1.

At this dyestuff content (about 2.9%), the solution is subjected to continuous diapermeation with 850 kg of demineralized water. (Fresh water runs in at the rate at which permeate is withdrawn).

The solution is then concentrated further to 170 kg with a dyestuff content of 15%.

The $So_4^{--}$ content is 0.3%, and the $Ca^{++}$ content is <50 mg/kg solution.

The solution is bUffered at pH 4–4.5 with 0.85 kg of boric acid and has the same good storage stability and technological properties as described in the previous examples.

EXAMPLE 6

15 kg of a solution containing 6.25% of pure dyestuff of the formula (1) and 4.2% of $SO_4^{2-}$ at a cation ratio of mol of Na:Li:K of 1:55 : 8.5 are processed in accordance with Example 1 via ultrafiltration to give a stable concentrated solution which likewise has the same good technological properties as described in Example 1.

EXAMPLES 7–10

The procedure is analogous to Example 6, the following molar cation ratios being used:

|  | Na | Li | K | NH4 |
|---|---|---|---|---|
| Example 7 | 1 | 0 | 0 | 0 |
| 8 | 1 | 1 | 0 | 1 |
| 9 | 0 | 1 | 0 | 0 |
| 10 | 1 | 0 | 1 | 0 |

The solutions resulting from the above examples also have the good technological properties mentioned in Example 1.

We claim:
1. Process comprising: preparing concentrated storage-stable aqueous solutions of the dyestuff of the formula

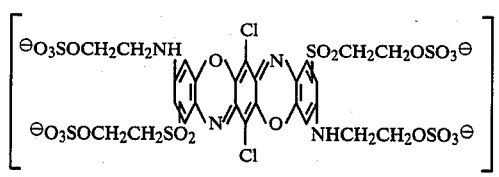

4Me⊕

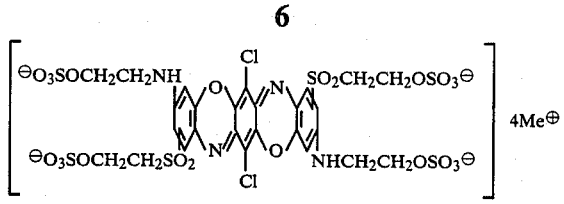

4Me⊕ wherein
Me⊕ is a cation conferring water-solubility, and providing solutions of maximized color yields in a pad-steam dyeing process, by obtaining the dyestuff directly on synthesis and subjecting said dyestuff to a membrane separation process.

2. Process according to claim 1, at least 1 equivalent of the cations being a lithium ion.

wherein
Me⊕ is a cation conferring water-solubility, and providing solutions of maximized color yields in a pad-steam dyeing process, by obtaining the dyestuff directly on synthesis and subjecting said dyestuff to a membrane separation process.

2. Process according to claim 1, at least 1 equivalent of the cations being a lithium ion.

* * * * *

UNITED STATES PATENT AND TRADEMARK OFFICE
CERTIFICATE OF CORRECTION

PATENT NO. : 4,778,603

DATED : October 18, 1988

INVENTOR(S) : Koll et al

It is certified that error appears in the above-identified patent and that said Letters Patent is hereby corrected as shown below:

Col. 4, line 36      Correct spelling of --buffered--

Col. 6, lines 1-15   Delete entire column

Signed and Sealed this

Twenty-second Day of August, 1989

Attest:

DONALD J. QUIGG

Attesting Officer    Commissioner of Patents and Trademarks